(12) United States Patent　　　　(10) Patent No.:　US 12,599,121 B2

Camargo　　　　　　　　　　　　　(45) Date of Patent:　　Apr. 14, 2026

(54) FISHING LINE TO LURE CONNECTOR

(71) Applicant: Juka Innovations Corporation,
　　　　　　　Farmingdale, NY (US)

(72) Inventor: Roberto Trevino Camargo, The
　　　　　　　Woodlands, TX (US)

(73) Assignee: Juka Innovations Corporation,
　　　　　　　Farmingdale, NY (US)

( * ) Notice:　Subject to any disclaimer, the term of this
　　　　　　　patent is extended or adjusted under 35
　　　　　　　U.S.C. 154(b) by 72 days.

(21) Appl. No.: 18/917,630

(22) Filed:　Oct. 16, 2024

(65)　　　　　Prior Publication Data

US 2025/0031682 A1　　Jan. 30, 2025

Related U.S. Application Data

(63) Continuation-in-part of application No. 29/872,753,
　　filed on Mar. 17, 2023.

(51) Int. Cl.
　　　*A01K 91/04*　　　　(2006.01)
(52) U.S. Cl.
　　　CPC ................................... *A01K 91/04* (2013.01)
(58) Field of Classification Search
　　　CPC ...... A01K 91/03; A01K 91/04; A01K 91/047;
　　　　　　A01K 95/02; A01K 97/06; A01K 85/18;
　　　　　　A01K 99/00; A01K 91/00; A01K 91/20;
　　　　　　　　　　Y10T 24/2187; B65H 75/406
　　See application file for complete search history.

(56)　　　　　References Cited

U.S. PATENT DOCUMENTS

| | | | | | |
|---|---|---|---|---|---|
| 2,646,643 | A | * | 7/1953 | Nordlund ............... | A01K 93/00 |
| | | | | | 43/43.11 |
| 2,669,054 | A | * | 2/1954 | Smith, Sr. .............. | A01K 93/00 |
| | | | | | 43/43.11 |
| 2,728,161 | A | * | 12/1955 | Mangel ................... | A01K 93/00 |
| | | | | | 43/43.11 |
| 3,364,613 | A | * | 1/1968 | Sewell ................... | A01K 93/00 |
| | | | | | 43/43.11 |
| 3,673,729 | A | * | 7/1972 | Lintz ...................... | A01K 93/00 |
| | | | | | 43/43.11 |
| 4,251,941 | A | * | 2/1981 | Howard ................. | A01K 93/00 |
| | | | | | 43/43.11 |
| 4,477,995 | A | * | 10/1984 | Fenn ...................... | A01K 91/20 |
| | | | | | 43/43.11 |

(Continued)

FOREIGN PATENT DOCUMENTS

CN　　　　118900648 A　* 11/2024　......... A63B 71/1225

*Primary Examiner* — Katelyn T Truong

(57)　　　　　　ABSTRACT

A fishing line to lure connector is an apparatus that eliminates the use of fishing knots to secure a desired lure to a fishing line. The apparatus includes a dial housing, a winding dial, a ratcheting mechanism, and a lure loop. The dial housing retains the winding dial, the ratcheting mechanism, and the lure loop as a single secure assembly. The winding dial facilitates the fastening of the fishing line to the apparatus without the use of fishing knots or other external tools. The ratcheting mechanism ensures that the fishing line is secured to the winding dial when the fishing line is coiled around the winding dial. The ratcheting mechanism enables the quick detachment of the fishing line from the winding dial. The lure loop enables the attachment of the desired lure to the dial housing so that the desired lure is secured to the fishing line by the apparatus.

20 Claims, 17 Drawing Sheets

(56) References Cited

U.S. PATENT DOCUMENTS

| | | | | | |
|---|---|---|---|---|---|
| 5,755,394 | A * | 5/1998 | Cordova | ............... | B65H 75/446 |
| | | | | | 242/587.1 |
| 6,880,285 | B1 * | 4/2005 | Frost | ...................... | A01K 93/00 |
| | | | | | 43/43.11 |
| 6,901,667 | B2 * | 6/2005 | Proulx | ............... | A01D 34/4163 |
| | | | | | 30/276 |
| 7,111,426 | B2 * | 9/2006 | Iliev | ...................... | A01K 83/06 |
| | | | | | 43/26.2 |
| 7,261,327 | B1 * | 8/2007 | Johnston | ................ | A01K 91/04 |
| | | | | | 289/17 |
| 7,367,522 | B2 * | 5/2008 | Chen | ........................ | A43C 7/00 |
| | | | | | 242/378.1 |
| 7,527,534 | B1 * | 5/2009 | Cheng | .................... | H02G 11/02 |
| | | | | | 439/770 |
| 7,640,668 | B2 * | 1/2010 | Lacona | .............. | A01D 34/4163 |
| | | | | | 30/276 |
| 8,186,097 | B2 * | 5/2012 | Crawford | ............... | A01K 61/90 |
| | | | | | 224/103 |
| 8,307,558 | B2 * | 11/2012 | Alliss | ................ | A01D 34/4166 |
| | | | | | 30/276 |
| 8,745,879 | B2 * | 6/2014 | Alliss | ................ | A01D 34/4162 |
| | | | | | 30/276 |
| 9,253,942 | B2 * | 2/2016 | Alliss | ................ | A01D 34/4162 |
| 9,890,012 | B1 * | 2/2018 | Polen | .................... | B65H 75/28 |
| 11,603,283 | B2 * | 3/2023 | Kim | ...................... | A43C 11/165 |
| 11,805,856 | B2 * | 11/2023 | Chen | ...................... | A43C 11/20 |
| 12,185,796 | B2 * | 1/2025 | Hurley | .............. | B65H 75/4431 |
| 12,207,706 | B2 * | 1/2025 | Chen | ..................... | A43C 11/165 |
| 2003/0168545 | A1 * | 9/2003 | Yu | ......................... | B65H 75/406 |
| | | | | | 242/388.1 |
| 2004/0045851 | A1 * | 3/2004 | Watari | ............... | B65H 75/4428 |
| | | | | | 206/409 |
| 2006/0266864 | A1 * | 11/2006 | Hade | .................... | B65H 75/446 |
| | | | | | 242/370 |
| 2009/0044441 | A1 * | 2/2009 | Neal | ....................... | A01K 91/04 |
| | | | | | 43/43.1 |
| 2009/0172955 | A1 * | 7/2009 | Morris | ............... | A01D 34/4163 |
| | | | | | 30/276 |
| 2011/0239468 | A1 * | 10/2011 | Conlon | .............. | A01D 34/4163 |
| | | | | | 30/276 |
| 2013/0025100 | A1 * | 1/2013 | Ha | ........................ | A43C 11/165 |
| | | | | | 24/712.9 |
| 2014/0208630 | A1 * | 7/2014 | Pearcy | ................... | A01K 91/03 |
| | | | | | 43/43.1 |
| 2014/0215894 | A1 * | 8/2014 | Mika | .................... | A01K 91/065 |
| | | | | | 43/43.1 |
| 2014/0259301 | A1 * | 9/2014 | Berns | ...................... | A43C 9/00 |
| | | | | | 2/336 |
| 2015/0121669 | A1 * | 5/2015 | Jungkind | ............... | A43C 11/16 |
| | | | | | 24/712.5 |
| 2015/0191326 | A1 * | 7/2015 | Hall | .................... | A43C 11/165 |
| | | | | | 242/396.4 |
| 2017/0295888 | A1 * | 10/2017 | Chen | .................... | A43C 11/165 |
| 2017/0347523 | A1 * | 12/2017 | Alliss | ................ | A01D 34/4166 |
| 2021/0269275 | A1 * | 9/2021 | Kim | ...................... | B65H 54/02 |
| 2022/0119220 | A1 * | 4/2022 | Li | ...................... | B65H 75/4431 |

* cited by examiner 17, 22

17, 18

FISHING LINE TO LURE CONNECTOR

The current application is a continuation-in-part (CIP) application of the U.S. design application Ser. No. 29/872, 753 filed on Mar. 17, 2023.

FIELD OF THE INVENTION

The present invention generally relates to fishing equipment and quick-connect accessories. More specifically, the present invention discloses a fishing accessory that facilitates the attachment of a lure to a fishing line.

BACKGROUND OF THE INVENTION

Nowadays, several fishing accessories are available that enable people of different skills to easily and efficiently fish. For example, some of the most popular fishing accessories are lure connectors that facilitate the attachment of a lure to a fishing line. In general, these connectors are designed to allow the indirect connection of the desired lure to the fishing line without having the lure being tied to the fishing line. Most lure connectors are designed so that the connector is attached to the fishing line on one side and the lure is attached to the connector on the opposite side. Some newer lure connectors are designed with a quick-connect feature that further facilitates the attachment of the lure to the connector. However, most of the available lure connectors require the connector to be tied to the fishing line, which complicates the attachment of the fishing line to the lure connector. So, there is a need for a better lure connector that can be easily attached to the fishing line to support one or more lures.

An objective of the present invention is to provide a fishing line to lure connector that facilitates the attachment of a lure to a fishing line without having to manually tie the fishing line to the connector. The present invention is designed to replace fishing knots so that the user can secure a lure to the fishing line without having to know how to tie a fishing knot. Another objective of the present invention is to facilitate the detachment of the fishing line from the present invention without the need of external tools or other fishing accessories. The present invention includes a manual mechanism that does not require the use of other tools so that the user can utilize the present invention effortlessly while fishing. Additional features and benefits of the present invention are further discussed in the sections below.

SUMMARY OF THE INVENTION

The present invention discloses a fishing line to lure connector that facilitates the attachment of a lure to a fishing line without having to utilize external tools or having to tie the lure to the fishing line using fishing knots. The present invention is designed as a portable device that can be easily carried by the user when going fishing. In the preferred embodiment, the present invention includes a dial housing, a winding dial, a ratcheting mechanism, and a lure loop. The dial housing is a portable structure designed to be handheld and large enough to support the lure while fishing. In addition, the dial housing is designed to accommodate the winding dial, the ratcheting mechanism, and lure loop in a secure assembly that can be deployed to the water without risk of disassembly. Further, the lure loop is integrated into the dial housing to securely receive the desired lure to be used while fishing.

In addition, the ratcheting mechanism is designed to facilitate the fastening of the fishing line to the winding dial, which secures the dial housing to the fishing line. The ratcheting mechanism also enables the easy disengagement of the fishing line from the winding dial when desired. Further, the winding dial enables the manual engagement of the ratcheting mechanism to secure the fishing line to the present invention or to disengage the fishing line from the present invention. In addition, the ratcheting mechanism secures the winding dial in place to prevent the accidental disengagement of the fishing line. Furthermore, the present invention includes several features that facilitate the manual use of the present invention while fishing.

DETAILED DESCRIPTION OF THE INVENTION

Figure 1:
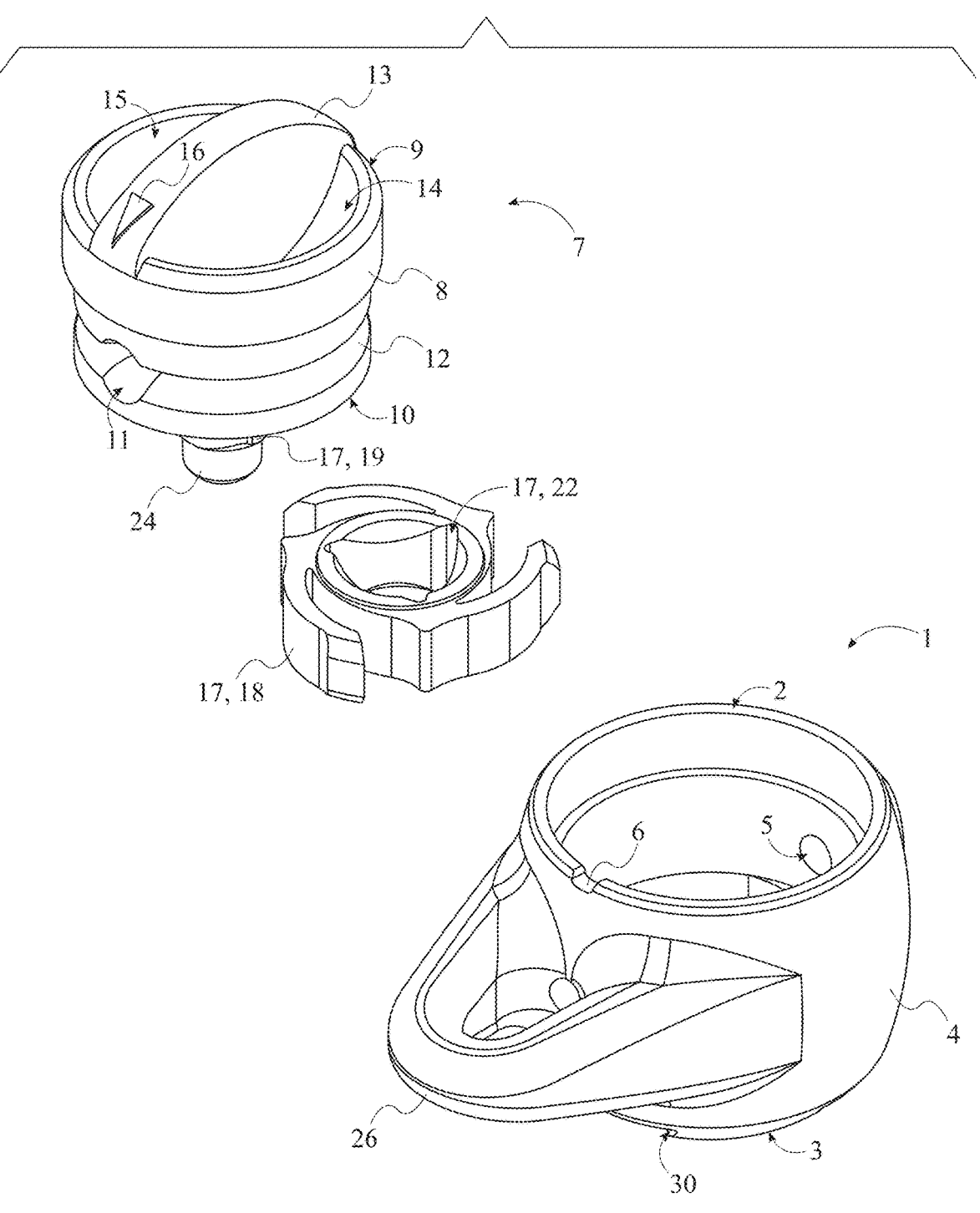
FIG. 1 is a top-front-left exploded perspective view of the present invention.
Figure 2:
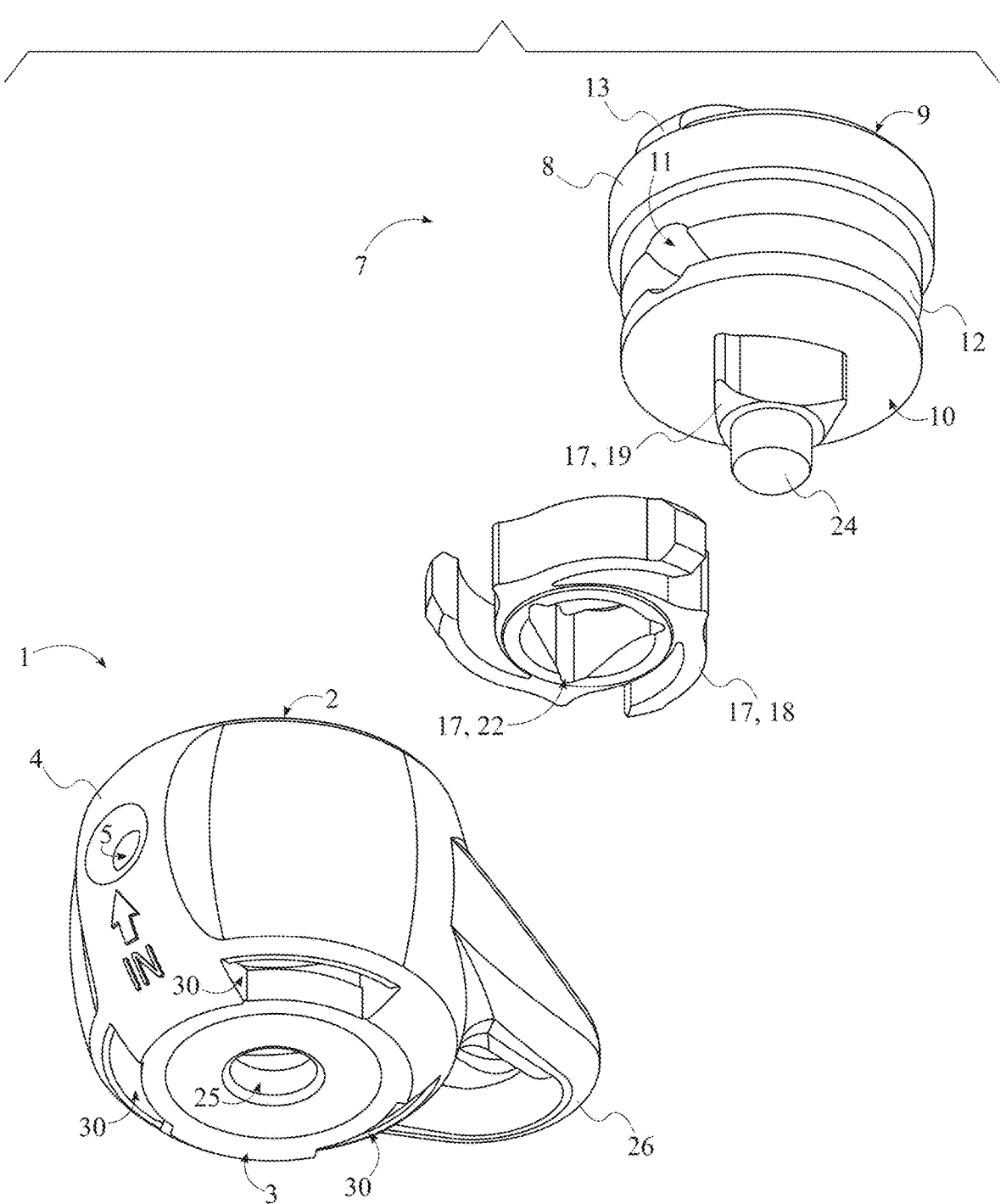
FIG. 2 is a bottom-rear-right exploded perspective view of the present invention.
Figure 3:
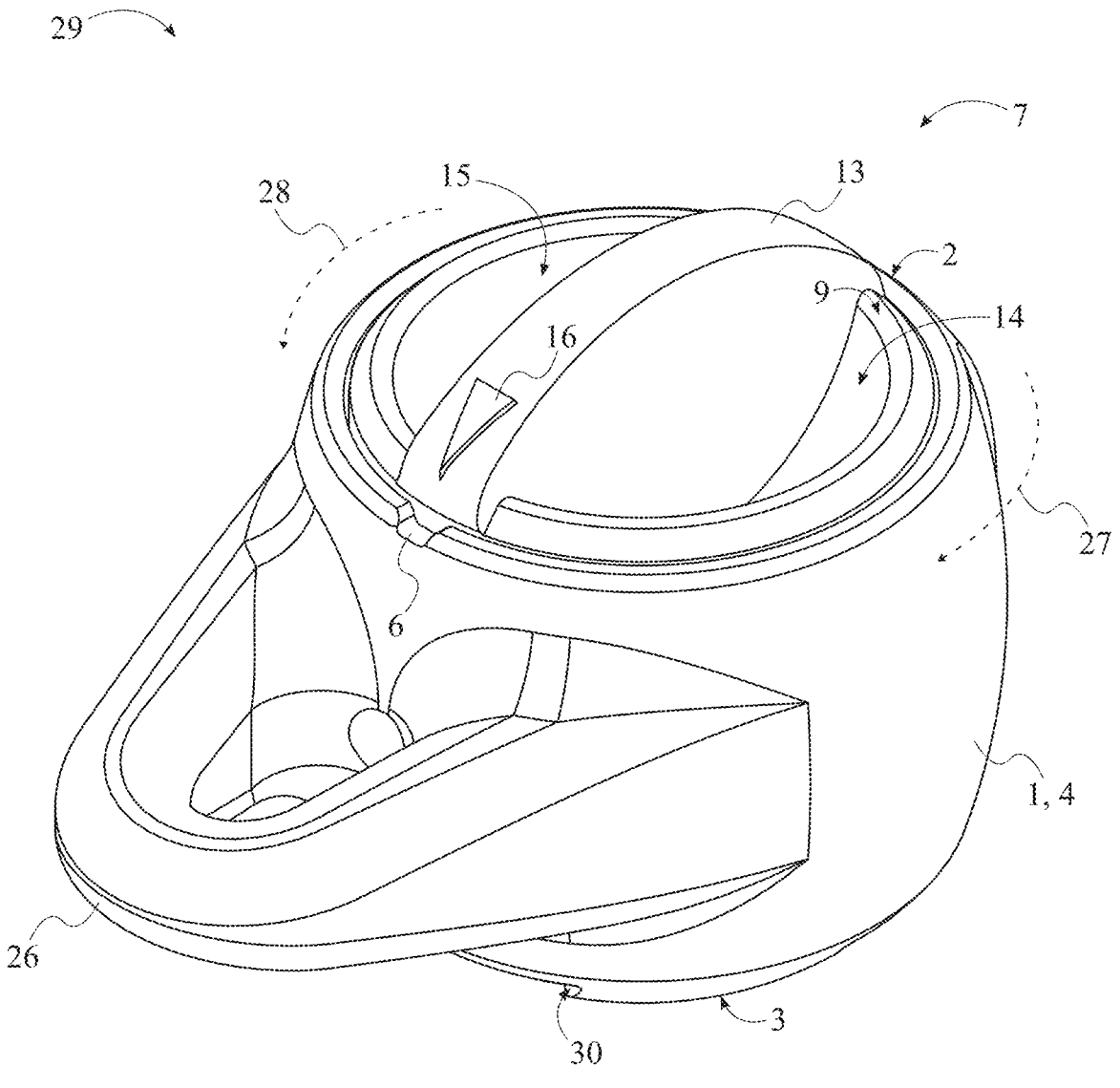
FIG. 3 is a top-front-left perspective view of the present invention, wherein the present invention is shown in the line-inserting configuration.
Figure 4:
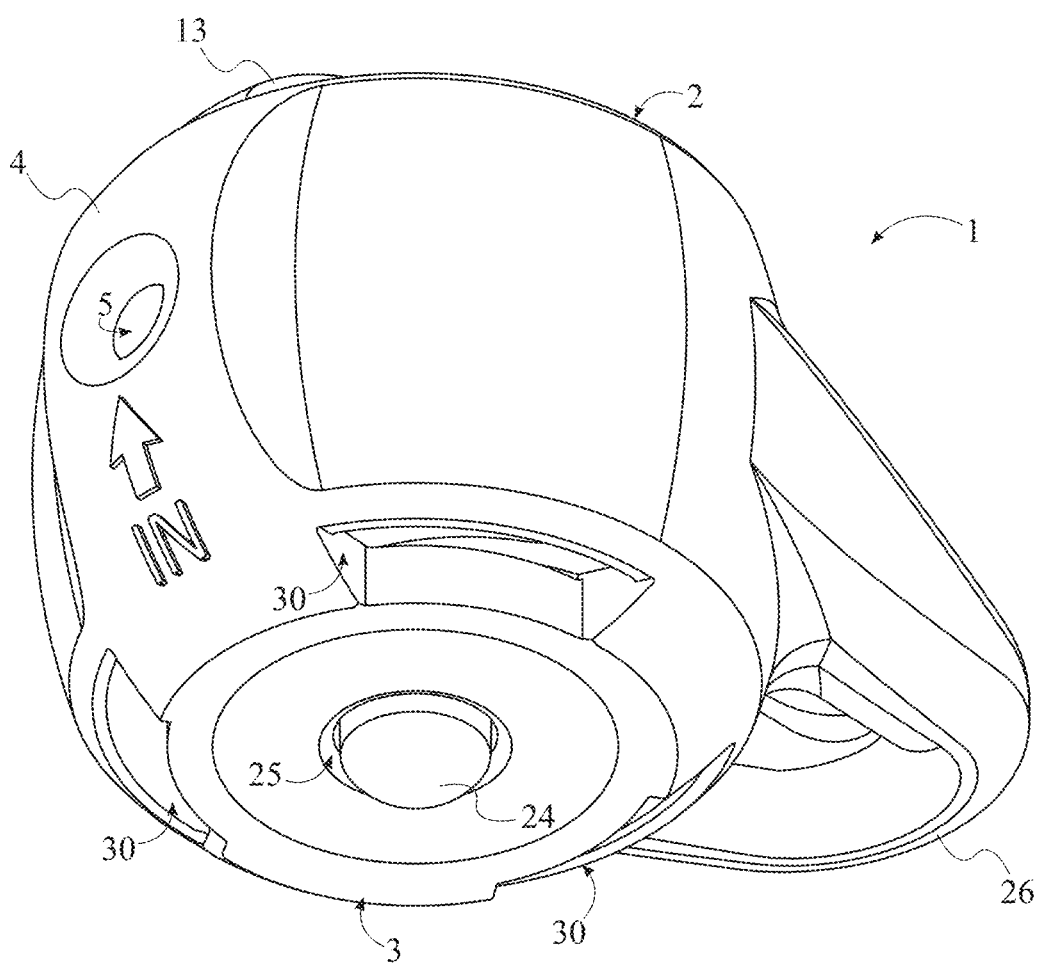
FIG. 4 is a bottom-rear-right perspective view of the present invention thereof.
Figure 5:
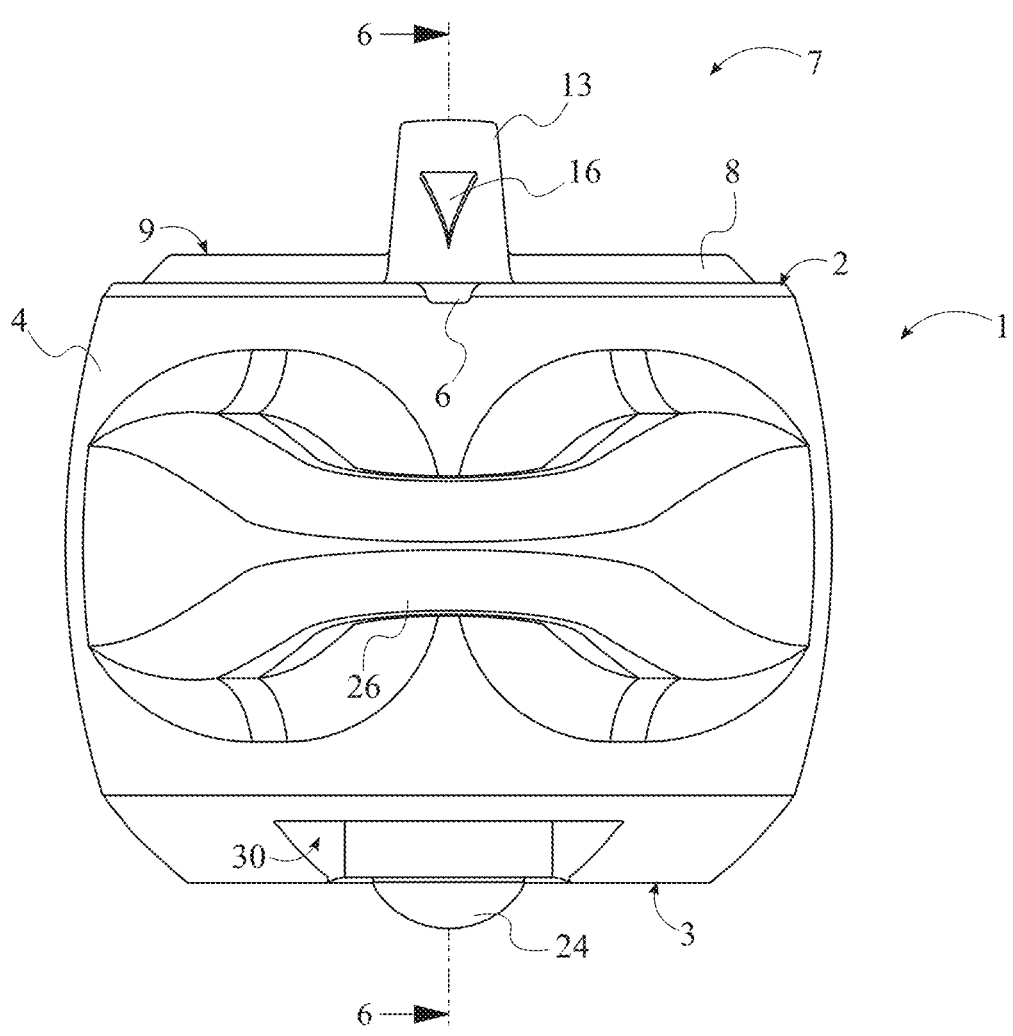
FIG. 5 is a front view of the present invention thereof.
Figure 6:
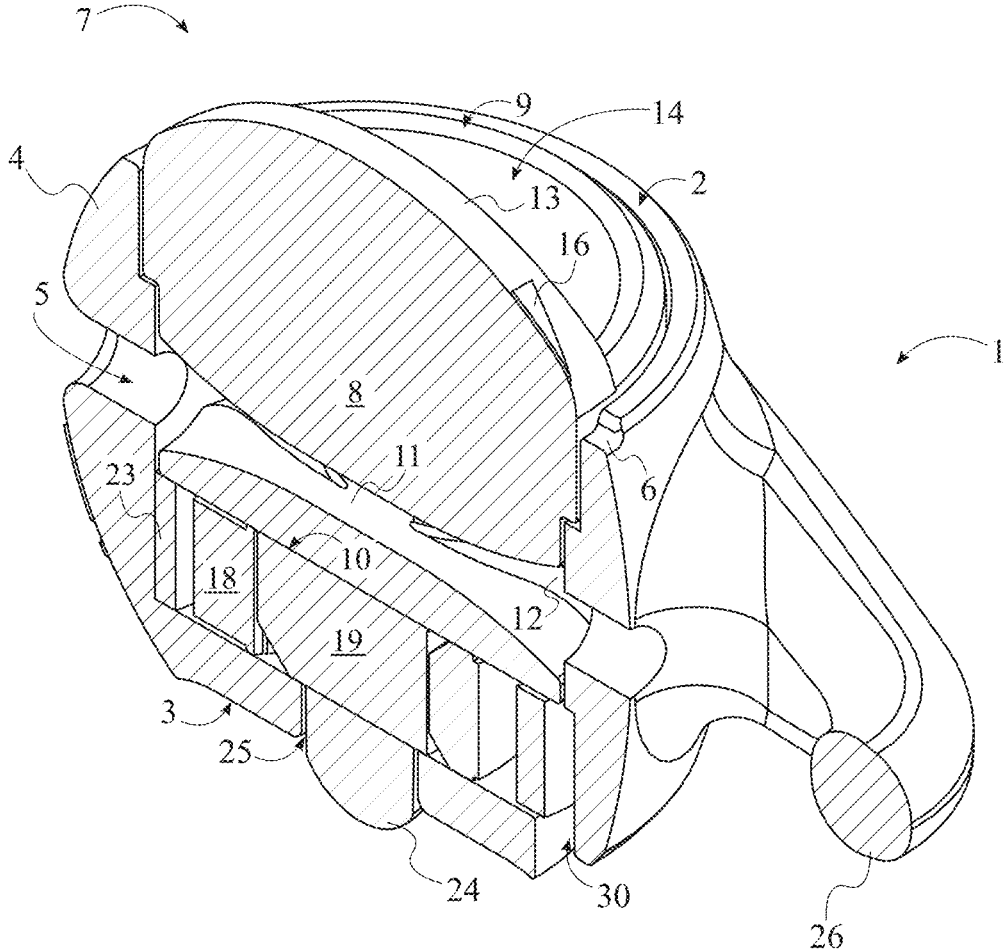
FIG. 6 is a perspective cross-sectional view of the present invention taken along line 6-6 in FIG. 5.

All illustrations of the drawings are for the purpose of describing selected versions of the present invention and are not intended to limit the scope of the present invention.

The present invention discloses a fishing line to lure connector that eliminates the use of fishing knots to secure a desired lure to the fishing line. As can be seen in FIGS. 1 through 9, in the preferred embodiment, the present invention comprises a dial housing 1, a winding dial 7, a ratcheting mechanism 17, and a lure loop 26. The dial housing 1 retains the winding dial 7, the ratcheting mechanism 17, and the lure loop 26 as a single secure assembly. The winding dial 7 facilitates the fastening of the fishing line to the present invention without the use of fishing knots or other external tools. The ratcheting mechanism 17 ensures that the fishing line is secured to the winding dial 7 when the fishing line is coiled around the winding dial 7. In addition, the ratcheting mechanism 17 enables the quick detachment of the fishing line from the winding dial 7. Further, the lure loop 26 enables the attachment of the desired lure to the dial housing 1 so that the desired lure is secured to the fishing line by the present invention.

The general configuration of the aforementioned components enables the user to easily secure the desired lure to the fishing line. As can be seen in FIGS. 1 through 9, the dial housing 1 is designed to accommodate the winding dial 7, the ratcheting mechanism 17, and the lure loop 26 to form a single secure assembly that can be deployed along with the desired lure to the water without risk of disassembly. In the preferred embodiment, the dial housing 1 is a short, round, and hollow cylindrical structure with flat bases. So, the dial housing 1 comprises an open housing base 2, a closed housing base 3, a housing lateral wall 4, and an insertion hole 5. The open housing base 2 and the closed housing base 3 correspond to the flat bases of the cylindrical dial housing 1. The housing lateral wall 4 corresponds to the round cylindrical wall of the dial housing 1. Furthermore, the insertion hole 5 allows the insertion of the fishing line into dial housing 1 to engage the winding dial 7.

As can be seen in FIGS. 1 through 15, the winding dial 7 is designed as a short cylindrical structure large enough to fit within the dial housing 1. In addition, the winding dial 7 is designed so that the winding dial 7 can rotate within the dial housing 1. So, the winding dial 7 comprises a dial body 8, a first dial base 9, a second dial base 10, and a center channel 11. The dial body 8 corresponds to the main cylindrical structure of the winding dial 7, with the first dial base 9 and the second dial base 10 corresponding to the opposite cylindrical bases of the dial body 8. The center channel 11 enables the fishing line to be securely coiled around the dial body 8 without the fishing line accidentally coming loose. Further, the winding dial 7 is designed to engage the ratcheting mechanism 17 when the user rotates the dial body 8 within the dial housing 1.

In the preferred embodiment, the present invention can be arranged as follows: the open housing base 2 and the closed housing base 3 are positioned opposite to each other about the housing lateral wall 4 due to the overall cylindrical shape of the dial housing 1, as can be seen in FIGS. 1 through 12. Similarly, the first dial base 9 and the second dial base 10 are positioned opposite to each other about the dial body 8 due to the overall cylindrical shape of the winding dial 7. Further, the insertion hole 5 traverses into the dial housing 1 through the housing lateral wall 4 to form an opening through which the free end of the fishing line can be inserted into the dial housing 1. Moreover, the lure loop 26 is externally connected to the housing lateral wall 4 to secure the lure loop 26 to the dial housing 1. The lure loop 26 is designed as a rounded loop protrusion large enough to accommodate the desired lure. Further, the lure loop 26 and the insertion hole 5 are positioned opposite to each other about the housing lateral wall 4. This way, the fishing line and the desired lure do not obstruct each other when the desired lure along with the present invention are deployed into the water.

As can be seen in FIGS. 1 through 12, the center channel 11 laterally traverses through the dial body 8, coplanar to the insertion hole 5. This way, the fishing line can be inserted through the insertion hole 5 and into the center channel 11 to enable the winding line to be coiled around the dial body 8. In addition, the dial body 8 is rotatably mounted within the dial housing 1 so that dial body 8 can be rotated to coil the fishing line around the dial body 8. Further, the first dial base 9 is positioned adjacent to the open housing base 2 so that the user can rotate the dial body 8 by engaging the first dial base 9. On the other hand, the second dial base 10 is operatively connected to the closed housing base 3 by the ratcheting mechanism 17 to connect the dial body 8 to the ratcheting mechanism 17. The ratcheting mechanism 17 is used to incrementally rotate the dial body 8 in a first angular direction 27 to allow the fishing line to be coiled around the dial body 8. In addition, the ratcheting mechanism 17 is used to prevent rotation of the dial body 8 in a second angular direction 28 so that the dial body 8 does not rotate in the opposite direction and the fishing line becomes loose. Thus, the second angular direction 28 is opposite to the first angular direction 27 to facilitate the operation of the ratcheting mechanism 17. For example, the first angular direction 27 can correspond to the clockwise direction, while the second angular direction 28 can correspond to the counterclockwise direction. In other embodiments, different arrangements can be implemented to accommodate different lures.

Figure 7:
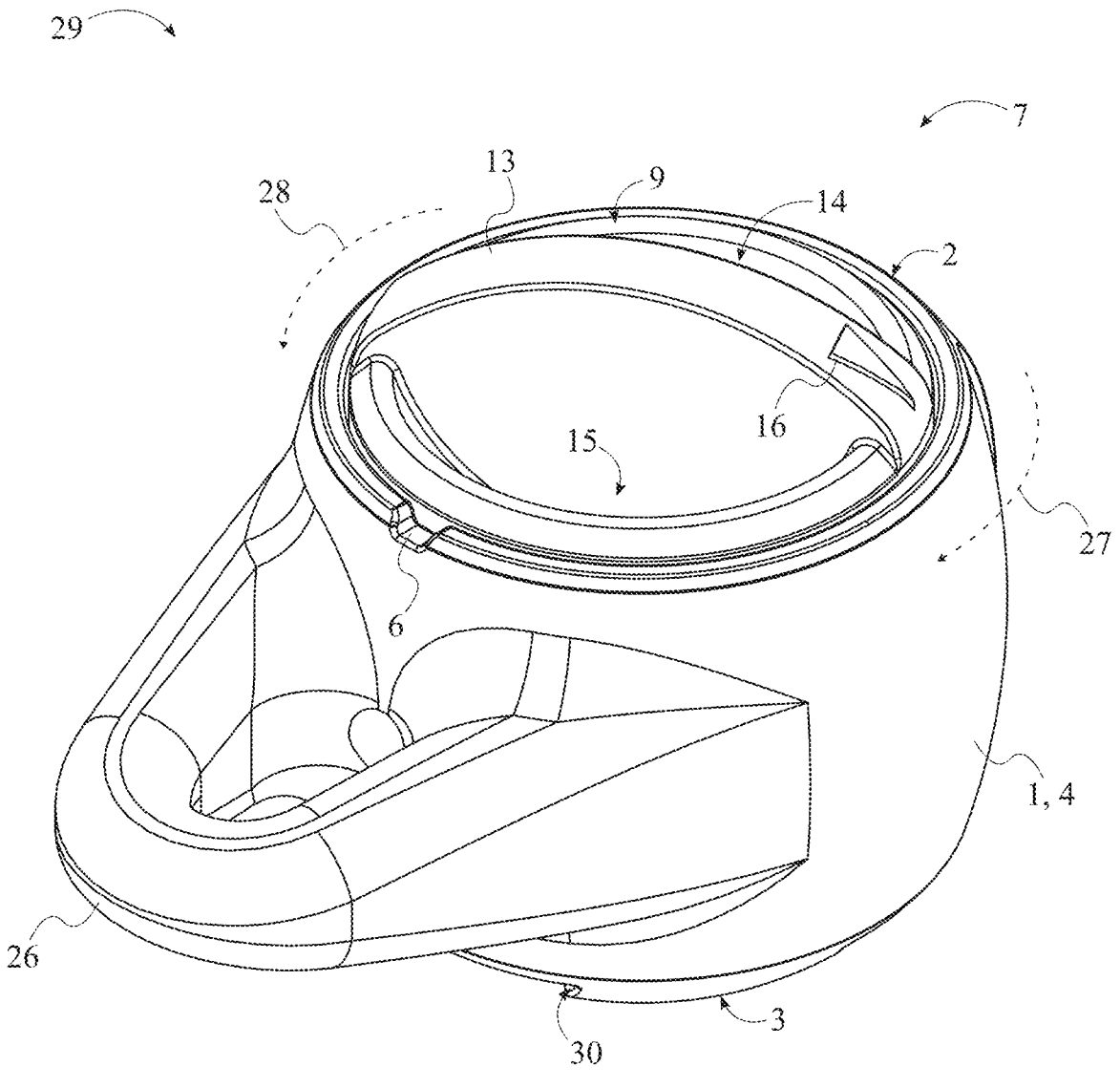
FIG. 7 is a top-front-left perspective view of the present invention, wherein the winding dial is shown rotated.
Figure 8:
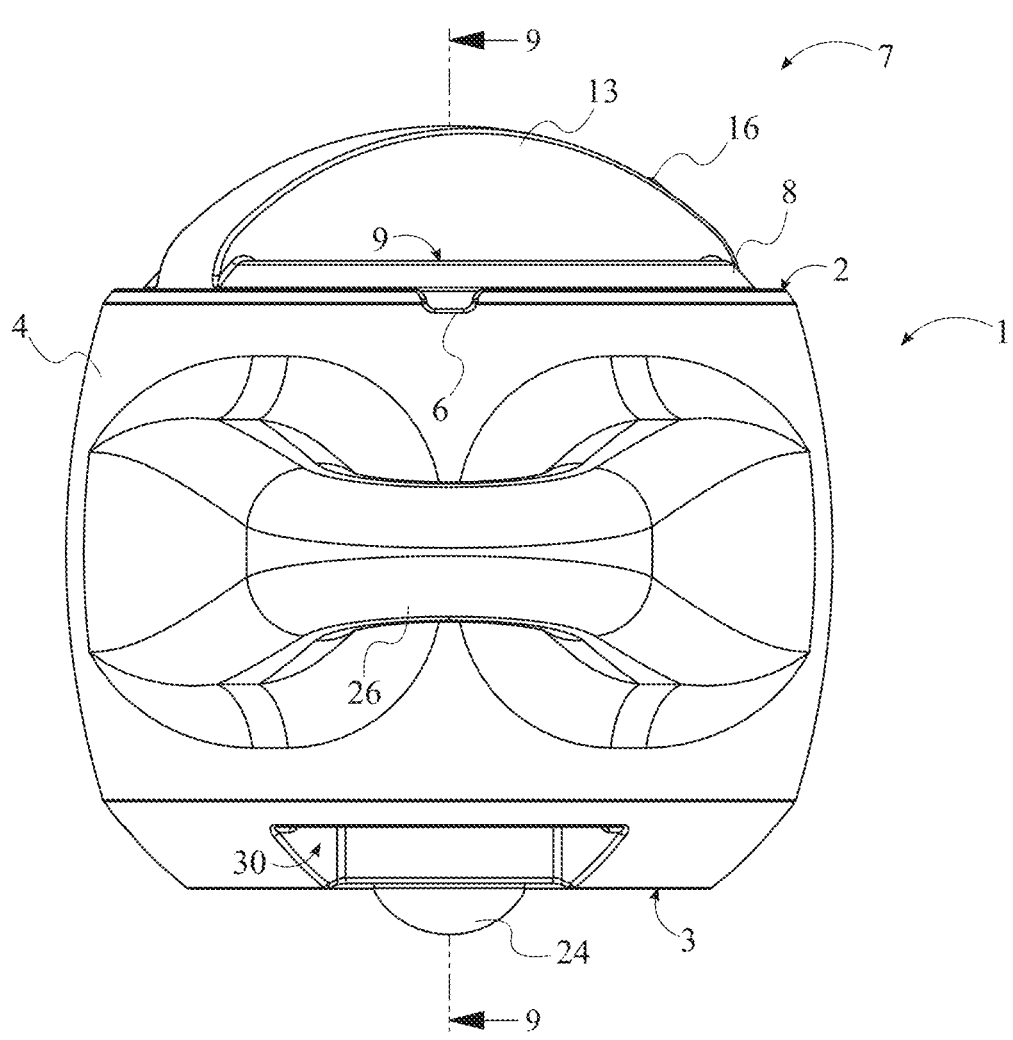
FIG. 8 is a front view of the present invention thereof.
Figure 9:
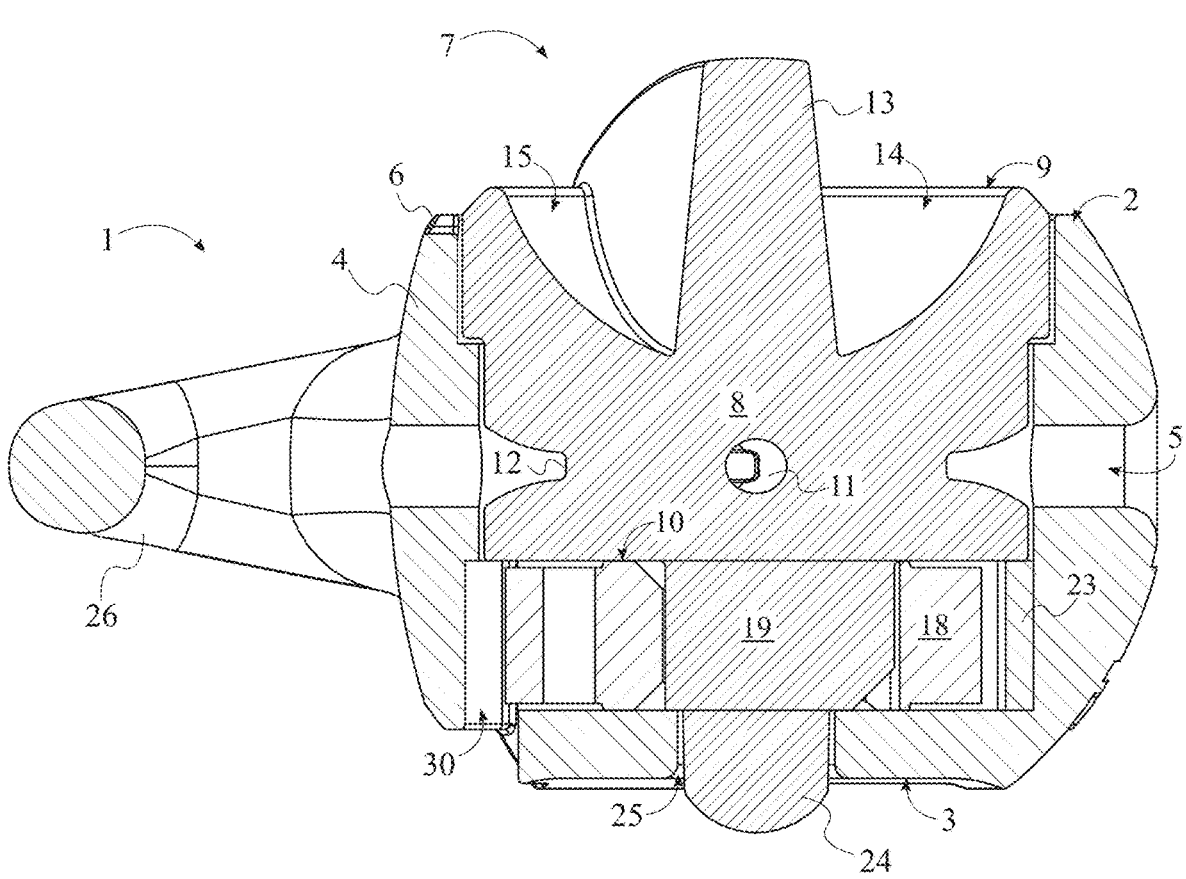
FIG. 9 is a vertical cross-sectional view of the present invention taken along line 9-9 in FIG. 8.
Figure 10:
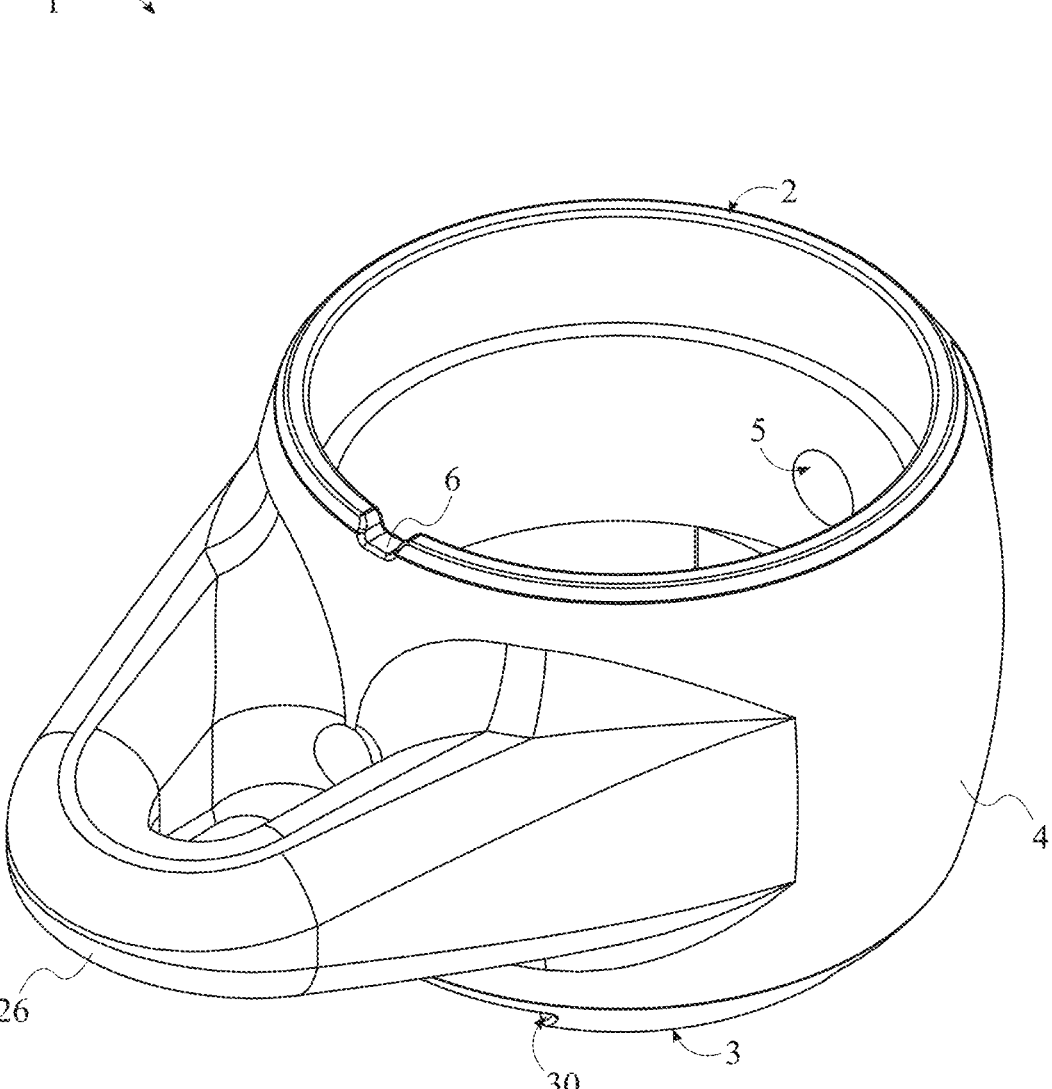
FIG. 10 is a top-front-left perspective view of the dial housing of the present invention.
Figure 11:
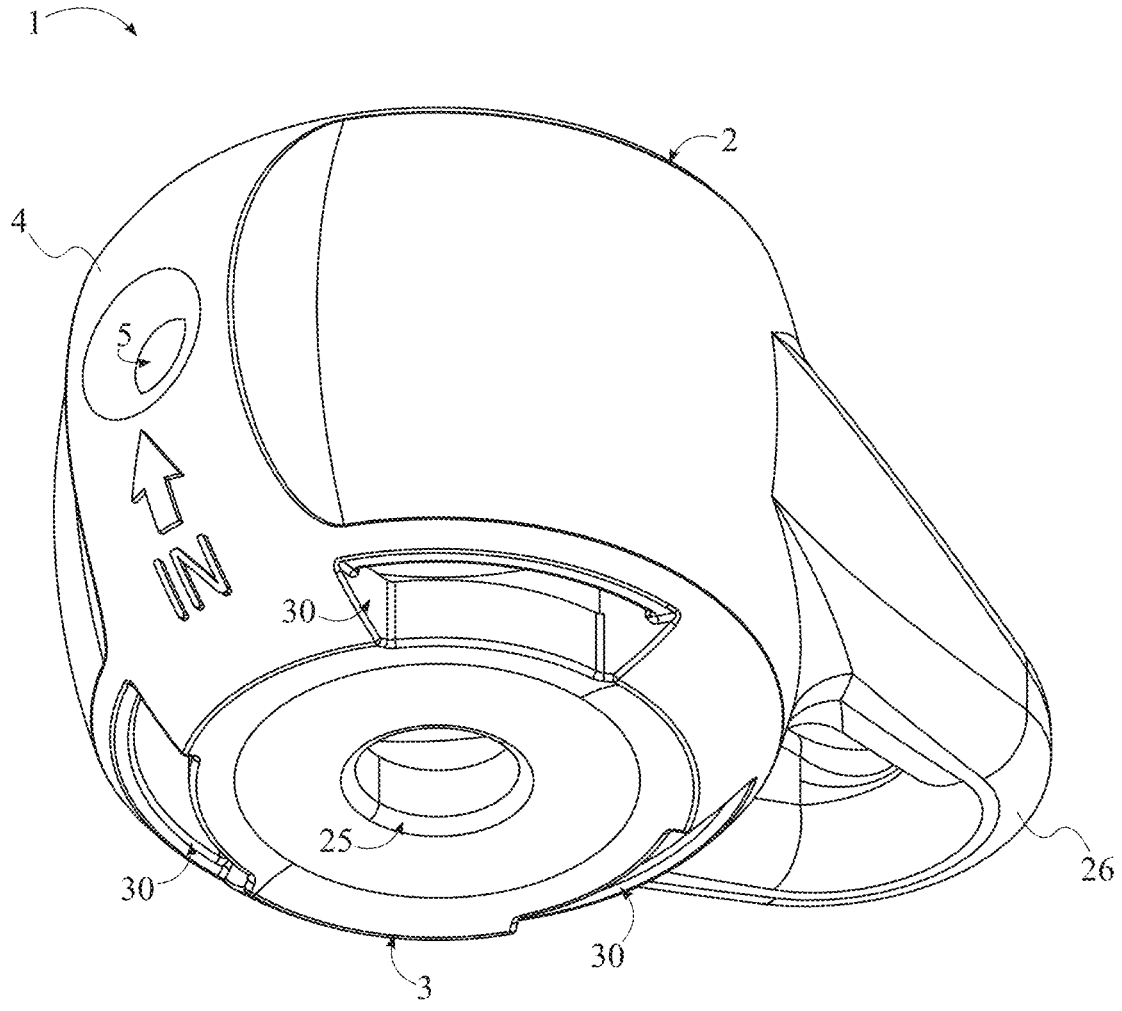
FIG. 11 is a bottom-rear-right perspective view of the dial housing of the present invention.
Figure 12:
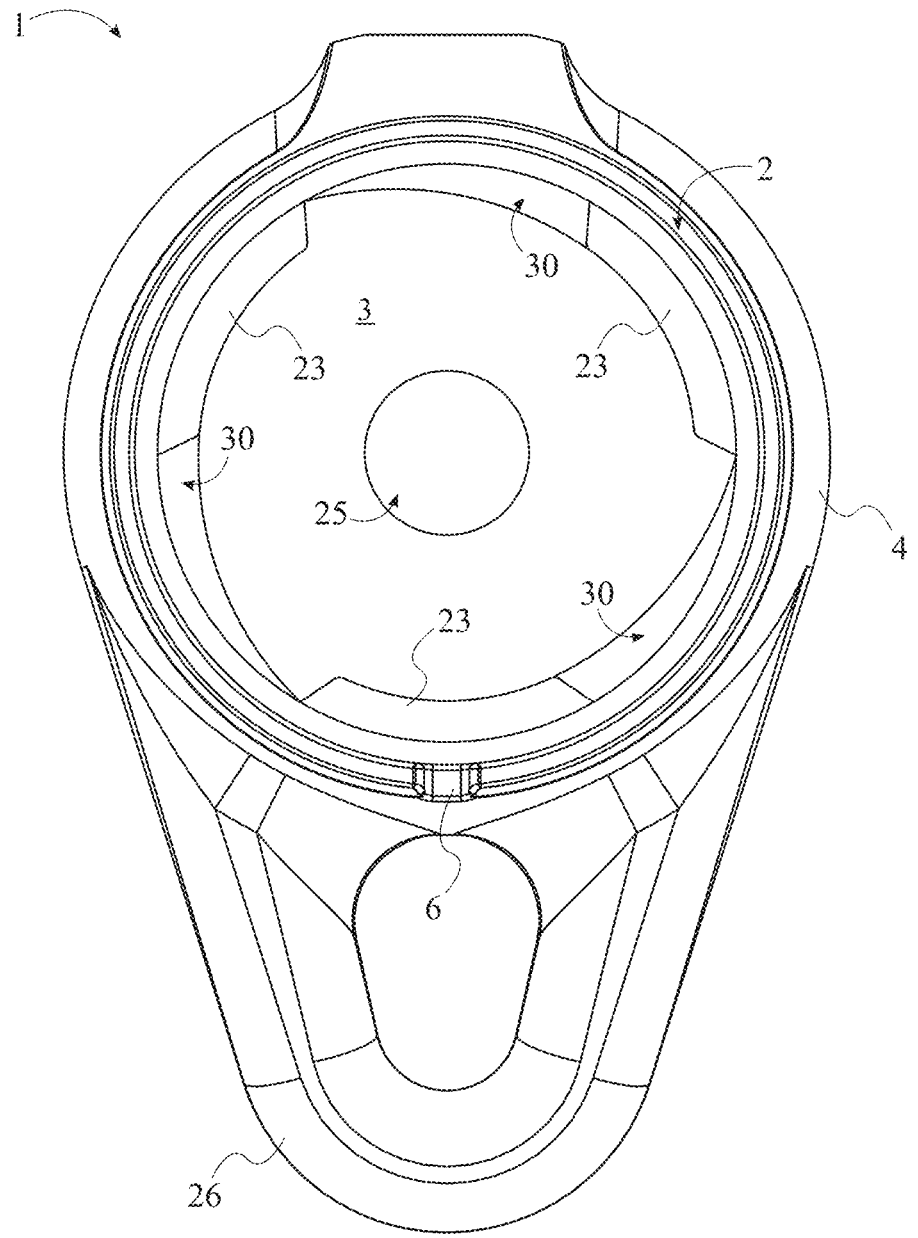
FIG. 12 is a top view of the dial housing of the present invention.

As previously discussed, the winding dial 7 can be rotated to enable the coil of the fishing line around the dial body 8. As can be seen in FIGS. 3 through 6, in a line-inserting configuration 29, the winding dial 7 and the dial housing 1 are arranged so that the fishing line can be inserted into the dial housing 1 to be coiled around the dial body 8. In the line-inserting configuration 29, the center channel 11 and the insertion hole 5 are concentrically positioned to each other to allow the fishing line to be positioned through the insertion hole 5 and the center channel 11. Once the fishing line is in position, then the user can rotate the winding dial 7 to coil the fishing line around the dial body 8. As can be seen in FIGS. 7 through 9, as the winding dial 7 is rotated, the fishing line coils around the dial body 8, ensuring that the fishing line is securely fastened around the dial body 8. Further, since the ratcheting mechanism 17 prevents the winding dial 7 from rotating in the opposite direction, the fishing line cannot get loose. In other embodiments, the coiling of the fishing line can be facilitated using different winding mechanisms implemented on the winding dial 7.

Figure 13:
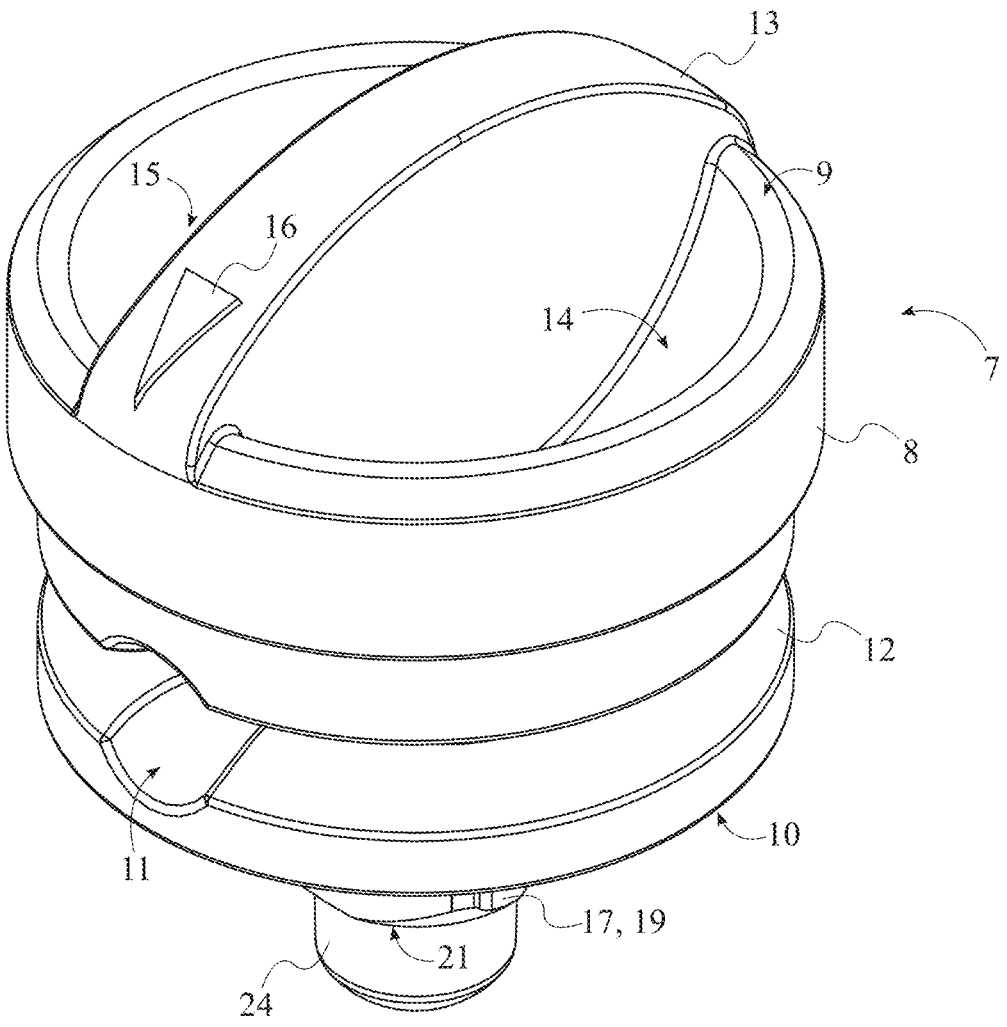
FIG. 13 is a top-front-left perspective view of the winding dial of the present invention.
Figure 14:
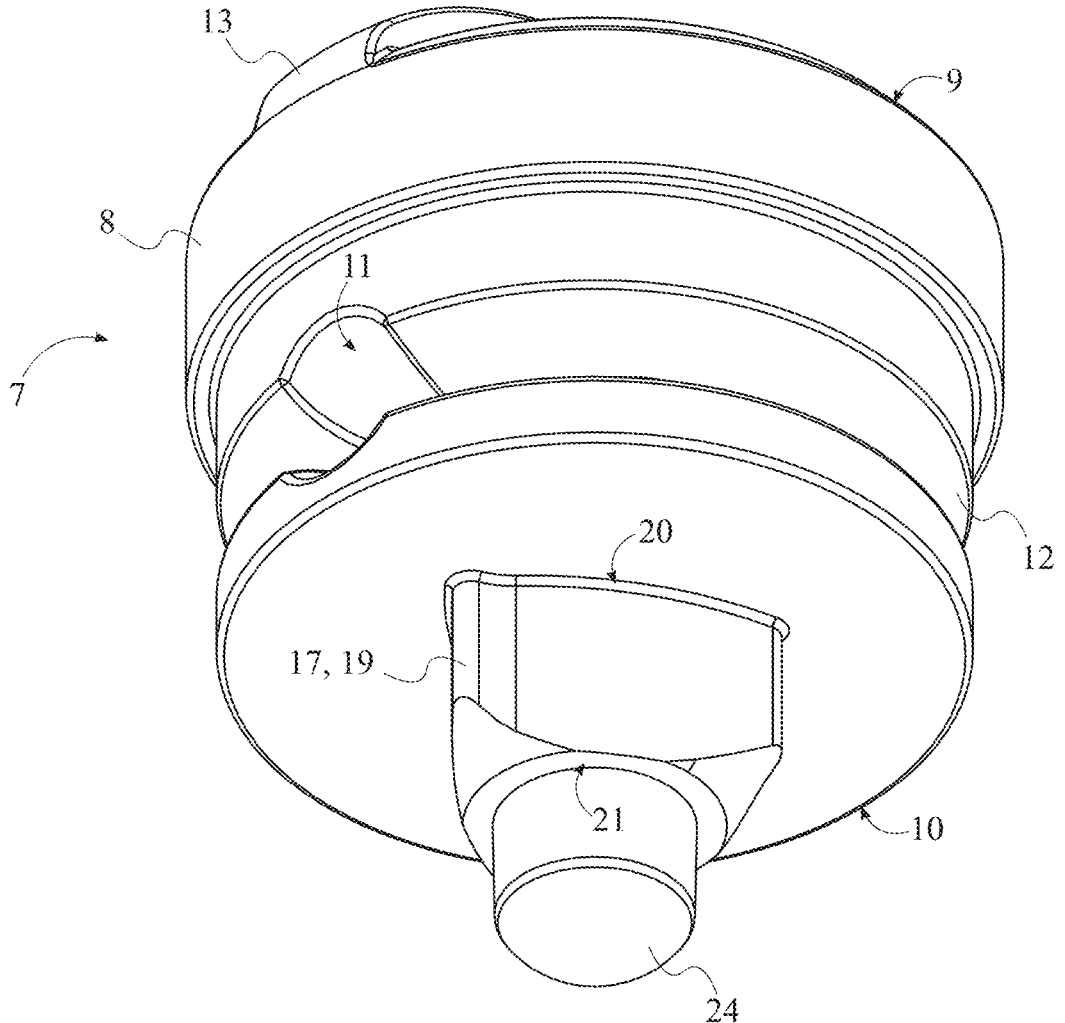
FIG. 14 is a bottom-rear-right perspective view of the winding dial of the present invention.
Figure 15:
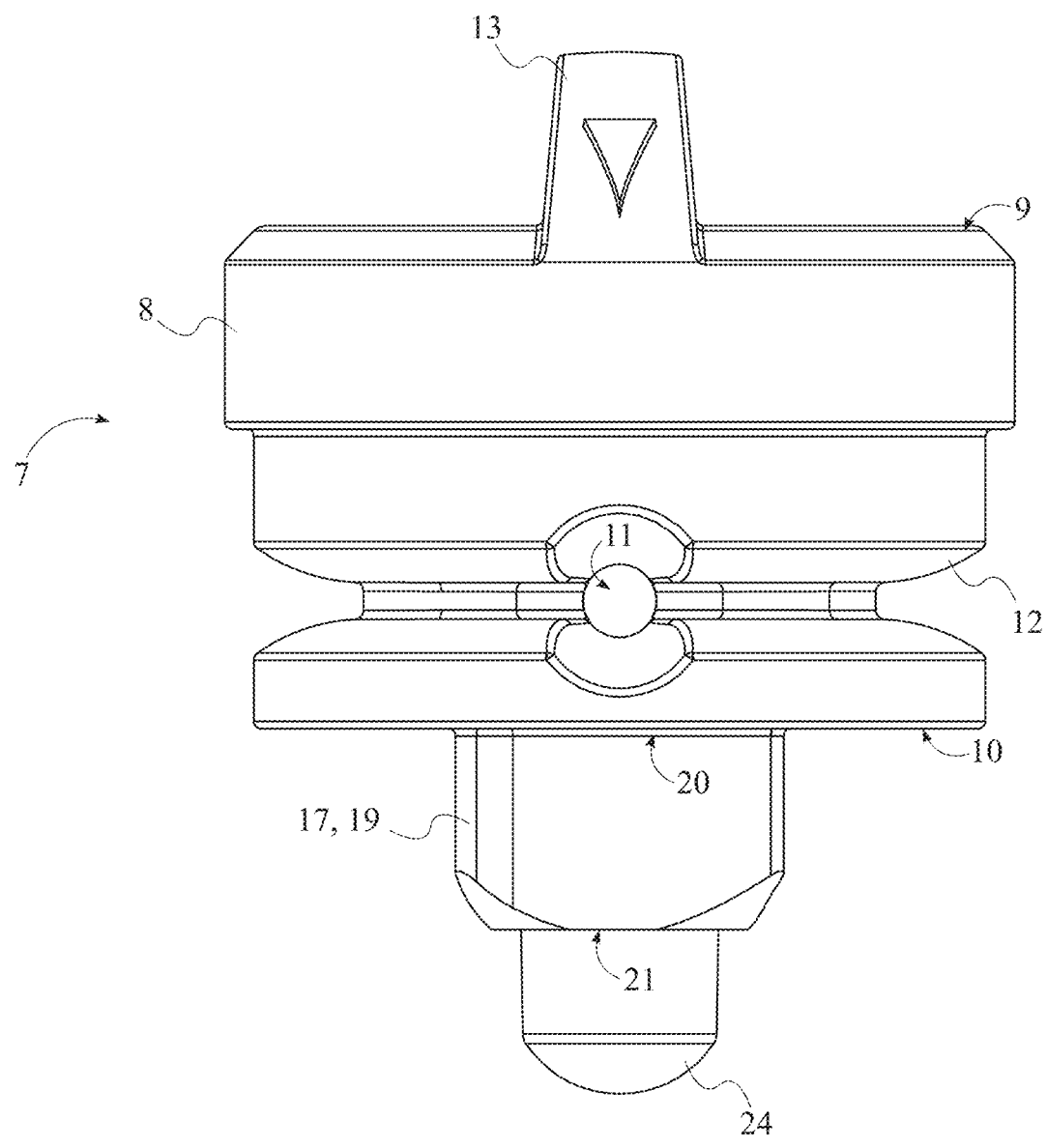
FIG. 15 is a front view of the winding dial of the present invention.
Figure 16:
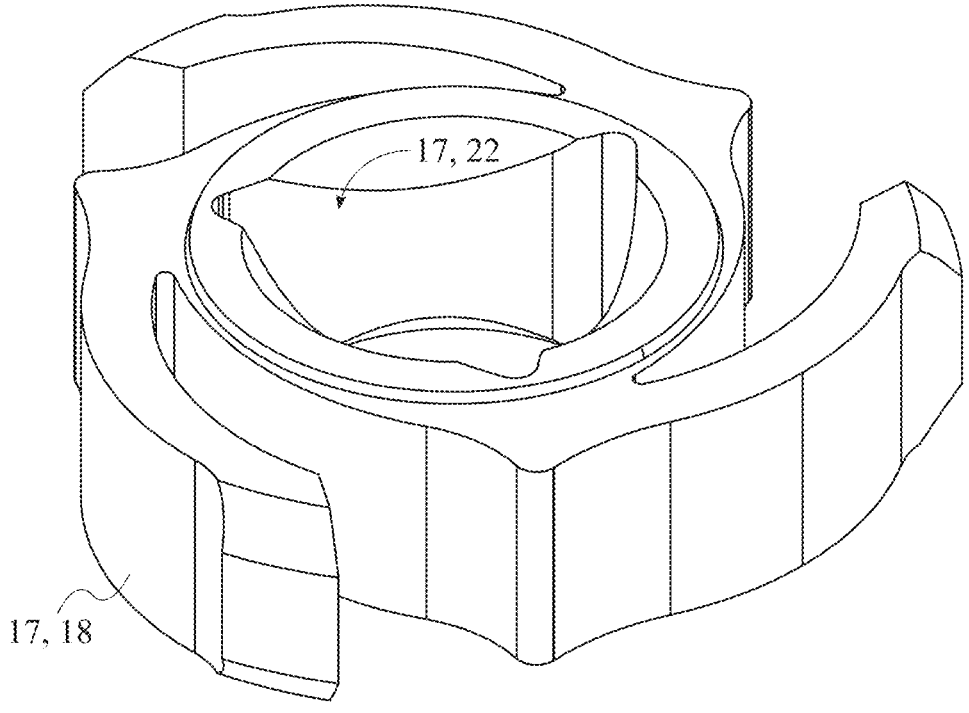
FIG. 16 is a top-front-left perspective view of the ratchet wheel of the ratcheting mechanism of the present invention.
Figure 17:
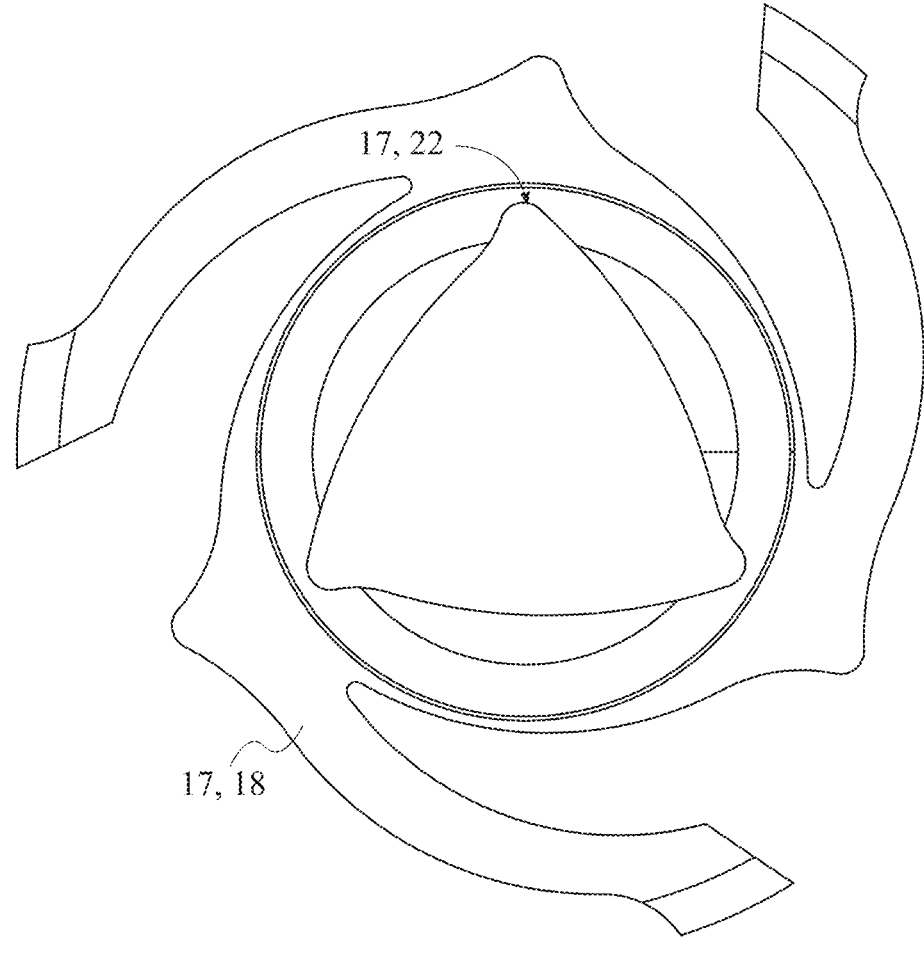
FIG. 17 is a top view of the ratchet wheel of the ratcheting mechanism of the present invention.

To further facilitate the coiling of the fishing line around the dial body 8 without obstructing the rotation of the winding dial 7, the winding dial 7 may further comprise an annular groove 12. As can be seen in FIGS. 13 through 15, the annular groove 12 enables the fishing line to coil around the dial body 8 without increasing the overall diameter of the dial body 8, which may prevent the rotation of the winding dial 7. So, the annular groove 12 is laterally integrated into the dial body 8 to form a recession large enough to accommodate an amount of fishing line around the dial body 8 when coiled. Further, the annular groove 12 is intersected by the center channel 11 so that the fishing line can be coiled within the annular groove 12 after the fishing line is inserted through the center channel 11 and the winding dial 7 is rotated. In other embodiments, different winding features can be implemented that further facilitate the coiling of the fishing line around the dial body 8.

As previously discussed, the winding dial 7 is manually rotated by the user to coil the fishing line and secure the present invention to the fishing line. As can be seen in FIGS. 13 through 15, to facilitate the manual rotation of the winding dial 7, the winding dial 7 further comprises a dial handle 13. The dial handle 13 is designed to enable the user to rotate the winding dial 7 using two fingers. So, the dial handle 13 is positioned perpendicular to the first dial base 9 to provide a vertical structure that can be easily grabbed using two fingers. Furthermore, the dial handle 13 is diametrically connected across the first dial base 9 to provide a vertical structure large enough to be grabbed by two fingers.

To further facilitate the engagement of the dial handle 13 with two fingers, the winding dial 7 may further comprise a first finger indentation 14 and a second finger indentation 15. As can be seen in FIGS. 13 through 15, the first finger indentation 14 and the second finger indentation 15 enable the creation of additional space for the user's fingers to engage the dial handle 13 and turn the winding dial 7. So, the first finger indentation 14 and the second finger indentation 15 traverse into the dial body 8 from the first dial base 9 to form two spaces adjacent to the dial handle 13 to provide more space for the user to grab onto the dial handle 13. Further, the first finger indentation 14 is positioned adjacent to the dial handle 13. Similarly, the second finger indentation 15 is positioned adjacent to the dial handle 13, opposite to the first finger indentation 14. Thus, the two spaces formed by the first finger indentation 14 and the second finger indentation 15 are positioned opposite to each other across the dial handle 13 to accommodate the fingertips of the two fingers used to turn the winding dial 7. In other embodiments, different features can be implemented to help the user turn the winding dial 7 to securely engage the fishing line.

To facilitate the operation of the winding dial 7, the present invention can include means to help the user keep track of the angular positions of the winding dial 7 while coiling the fishing line. As can be seen in FIGS. 1 through 9, the winding dial 7 may further comprise a dial indicator 16 and the dial housing 1 may further comprise a housing indicator 6. The dial indicator 16 and the housing indicator 6 are designed to show the user where to position the winding dial 7 to enable the insertion of the fishing line into the center channel 11 through the insertion hole 5. To do so, the dial handle 13 is positioned coplanar to the center channel 11 so that the orientation of the dial handle 13 matches the orientation of the center channel 11. In addition, the dial indicator 16 is peripherally connected onto the dial handle 13 so that the rotation of the winding dial 7 by the dial handle 13 can be tracked using the dial indicator 16. Further, the housing indicator 6 is integrated into the housing lateral wall 4, coincident to the open housing base 2, to integrate the housing indicator 6 on the dial housing 1. In addition, the housing indicator 6 is positioned adjacent to the lure loop 26 so that the housing indicator 6 is positioned opposite the insertion hole 5. This way, when the dial handle 13 is turned so that the dial indicator 16 is positioned adjacent to the housing indicator 6, the winding dial 7 and the dial housing 1 are arranged into the line-inserting configuration 29. In other embodiments, other physical indicators can be implemented on different portions of the dial housing 1, such as a guide indicator that tells the user to insert the fishing line through the insertion hole 5.

As previously discussed, the ratcheting mechanism 17 is designed to enable the rotation of the winding dial 7 in the first angular direction 27 while preventing the rotation of the winding dial 7 in the second angular direction 28. As can be seen in FIGS. 1 through 9, 16, and 17, the ratcheting mechanism 17 preferably comprises a ratchet wheel 18, a wheel driver 19, a driver slot 22, and a plurality of pawl protrusions 23. The ratchet wheel 18 is designed to engage the plurality of pawl protrusions 23 to enable the rotation of the winding dial 7 in the first angular direction 27 while preventing the rotation of the winding dial 7 in the second angular direction 28. The ratchet wheel 18 is preferably an asymmetrical disk-like structure with a circular center and several radial protrusions that engage the plurality of pawl protrusions 23. The number of radial protrusions matches the number of pawl protrusions. Further, each of the pawl protrusions corresponds to a short protrusion large enough to engage the radial protrusions of the ratchet wheel 18. In addition, each of the pawl protrusions has a round end and a straight end. The straight ends of the plurality of pawl protrusions 23 block the movement of the ratchet wheel 18 in the second angular direction 28. The round ends of the plurality of pawl protrusions 23 enable the movement of the ratchet wheel 18 in the first angular direction 27. The wheel driver 19 enables the rotation of the winding dial 7 to drive the rotation of the ratchet wheel 18. The wheel driver 19 is preferably a short asymmetrical protrusion that engages the ratchet wheel 18. In addition, the wheel driver 19 comprises a proximal driver end 20 and a distal driver end 21 corresponding to the terminal ends of the wheel driver 19. Further, the driver slot 22 corresponds to a slot on the circular center of the ratchet wheel 18 that allows the wheel driver 19 to engage the ratchet wheel 18. So, the driver slot 22 and the wheel driver 19 have a matching cross-sectional shape and size.

In the preferred embodiment, the ratcheting mechanism 17 can be implemented as follows: the proximal driver end 20 is centrally connected onto the second dial base 10 to secure the wheel driver 19 to the dial body 8, as can be seen in FIGS. 1 through 9, 16, and 17. The wheel driver 19 is positioned geometrically normal to the second dial base 10 so that the wheel driver 19 is axially aligned with the dial body 8. Further, the driver slot 22 centrally traverses through the ratchet wheel 18 to form a hole that receives the wheel driver 19. In addition, the distal driver end 21 is torsionally attached through the driver slot 22 so that the wheel driver 19 engages the ratchet wheel 18. Further, the plurality of pawl protrusions 23 is radially connected within the housing lateral wall 4 to secure the plurality of pawl protrusions 23 to the inside of the dial housing 1. The plurality of pawl protrusions 23 is also positioned adjacent to the closed housing base 3 to engage the ratchet wheel 18. Further, the ratchet wheel 18 is operatively engaged with the plurality of pawl protrusions 23 to secure the ratcheting mechanism 17 when assembled. The plurality of pawl protrusions 23 is used to incrementally rotate the ratchet wheel 18 as the winding dial 7 is rotated by the user.

As previously discussed, the ratcheting mechanism 17 also enables the easy disengagement of the fishing line from the winding dial 7. As can be seen in FIGS. 1 through 9, the ratcheting mechanism 17 further comprises an ejection protrusion 24 and an ejection hole 25 that facilitate the detachment of the winding dial 7 from the dial housing 1. To do so, the ejection protrusion 24 is positioned colinear to the wheel driver 19 to match the axial alignment of the wheel driver 19. Unlike the wheel driver 19, the ejection protrusion 24 is a short cylindrical protrusion large enough to protrude out through the ejection hole 25 once the winding dial 7 is inserted into the dial housing 1 and the wheel driver 19 engages the ratchet wheel 18. Further, the ejection protrusion 24 is connected onto the distal driver end 21 to secure the ejection protrusion 24 to the wheel driver 19 and, consequently, to the dial body 8. On the other hand, the ejection hole 25 centrally traverses through the closed housing base 3 to form an opening that matches the location of the ejection protrusion 24 on the wheel driver 19. Furthermore, the ejection protrusion 24 is rotatably engaged into the ejection hole 25 to secure the ejection protrusion 24 inside the ejection hole 25 when assembled. The outer diameter size of the ejection protrusion 24 is large enough to snuggly fit within the ejection hole 25 so that the winding dial 7 does not come loose when assembled. This way, when the user wants to remove the winding dial 7 from the dial housing 1, the user pushes the ejection protrusion 24 into the dial housing 1 through the ejection hole 25 so that the winding dial 7 protrudes outward through the open housing base 2. Then, the user can remove the winding dial 7 and unwind the fishing line from the dial body 8. In other embodiments, different mechanisms can be utilized to help the user remove the winding dial 7 from the dial housing 1.

In the preferred embodiment, the dial housing 1 is deployed into the water along with the desired lure while fishing. As can be seen in FIGS. 1 through 12, to enable the present invention to sink to the desired depth in the water along with the lure, the present invention may further comprise a plurality of draining holes 30 that reduces the buoyancy of the dial housing 1 when deployed in the water. In addition, the plurality of draining holes 30 allows any water that gets into the dial housing 1 to be drained once the present invention is removed from the water. To do so, the plurality of draining holes 30 traverses out of the dial housing 1 through the closed housing base 3 to create openings on the dial housing 1 that allow water to flow through the plurality of draining holes 30. Further, the plurality of draining holes 30 is radially distributed around the closed housing base 3 to not obstruct the ratcheting mechanism 17 or the ejection protrusion 24. In other embodiments, different features can be implemented that increase the functionality of the present invention once deployed in the water.

Although the invention has been explained in relation to its preferred embodiment, it is to be understood that many other possible modifications and variations can be made without departing from the spirit and scope of the invention.

What is claimed is:

1. A fishing line to lure connector comprising:
a dial housing;
a winding dial;
a ratcheting mechanism;
a lure loop;
the dial housing comprising an open housing base, a closed housing base, a housing lateral wall, and an insertion hole;
the winding dial comprising a dial body, a first dial base, a second dial base, and a center channel;
the open housing base and the closed housing base being positioned opposite to each other about the housing lateral wall;
the first dial base and the second dial base being positioned opposite to each other about the dial body;
the insertion hole traversing into the dial housing through the housing lateral wall;
the lure loop being externally connected to the housing lateral wall;
the lure loop and the insertion hole being positioned opposite to each other about the housing lateral wall;
the center channel laterally traversing through the dial body, coplanar to the insertion hole;
the dial body being rotatably mounted within the dial housing;
the first dial base being positioned adjacent to the open housing base; and
the second dial base being operatively connected to the closed housing base by the ratcheting mechanism, wherein the ratcheting mechanism is used to incrementally rotate the dial body in a first angular direction and is used to prevent rotation of the dial body in a second angular direction, and wherein the second angular direction is opposite to the first angular direction.

2. The fishing line to lure connector as claimed in claim 1 further comprising:
wherein the winding dial and the dial housing are arranged into a line-inserting configuration; and
the center channel and the insertion hole being concentrically positioned to each other.

3. The fishing line to lure connector as claimed in claim 1 further comprising:
the winding dial further comprising an annular groove;
the annular groove being laterally integrated into the dial body; and
the annular groove being intersected by the center channel.

4. The fishing line to lure connector as claimed in claim 1 further comprising:
the winding dial further comprising a dial handle;
the dial handle being positioned perpendicular to the first dial base; and
the dial handle being diametrically connected across the first dial base.

5. The fishing line to lure connector as claimed in claim 4 further comprising:
the winding dial further comprising a first finger indentation and a second finger indentation;
the first finger indentation and the second finger indentation traversing into the dial body from the first dial base;
the first finger indentation being positioned adjacent to the dial handle; and
the second finger indentation being positioned adjacent to the dial handle, opposite to the first finger indentation.

6. The fishing line to lure connector as claimed in claim 4 further comprising:
the winding dial further comprising a dial indicator;
the dial housing further comprising a housing indicator;
the dial handle being positioned coplanar to the center channel;
the dial indicator being peripherally connected onto the dial handle;
the housing indicator being integrated into the housing lateral wall, coincident to the open housing base; and
the housing indicator being positioned adjacent to the lure loop.

7. The fishing line to lure connector as claimed in claim 1 further comprising:
the ratcheting mechanism comprising a ratchet wheel, a wheel driver, a driver slot, and a plurality of pawl protrusions;
the wheel driver comprising a proximal driver end and a distal driver end;
the proximal driver end being centrally connected onto the second dial base;
the wheel driver being positioned normal to the second dial base;
the driver slot centrally traversing through the ratchet wheel;
the distal driver end being torsionally attached through the driver slot;
the plurality of pawl protrusions being radially connected within the housing lateral wall;
the plurality of pawl protrusions being positioned adjacent to the closed housing base; and the ratchet wheel being operatively engaged with the plurality of pawl protrusions, wherein the plurality of pawl protrusions is used to incrementally rotate the ratchet wheel.

8. The fishing line to lure connector as claimed in claim 7 further comprising:

the ratcheting mechanism further comprising an ejection protrusion and an ejection hole;

the ejection protrusion being positioned colinear to the wheel driver;

the ejection protrusion being connected onto the distal driver end;

the ejection hole centrally traversing through the closed housing base; and the ejection protrusion being rotatably engaged into the ejection hole.

9. The fishing line to lure connector as claimed in claim 1 further comprising:

a plurality of draining holes;

the plurality of draining holes traversing out of the dial housing through the closed housing base; and the plurality of draining holes being radially distributed around the closed housing base.

10. A fishing line to lure connector comprising:

a dial housing;

a winding dial;

a ratcheting mechanism;

a lure loop;

the dial housing comprising an open housing base, a closed housing base, a housing lateral wall, and an insertion hole;

the winding dial comprising a dial body, a first dial base, a second dial base, a center channel, and an annular groove;

the open housing base and the closed housing base being positioned opposite to each other about the housing lateral wall;

the first dial base and the second dial base being positioned opposite to each other about the dial body;

the insertion hole traversing into the dial housing through the housing lateral wall;

the lure loop being externally connected to the housing lateral wall;

the lure loop and the insertion hole being positioned opposite to each other about the housing lateral wall;

the center channel laterally traversing through the dial body, coplanar to the insertion hole;

the dial body being rotatably mounted within the dial housing;

the annular groove being laterally integrated into the dial body;

the annular groove being intersected by the center channel;

the first dial base being positioned adjacent to the open housing base; and the second dial base being operatively connected to the closed housing base by the ratcheting mechanism, wherein the ratcheting mechanism is used to incrementally rotate the dial body in a first angular direction and is used to prevent rotation of the dial body in a second angular direction, and wherein the second angular direction is opposite to the first angular direction.

11. The fishing line to lure connector as claimed in claim 10 further comprising:

wherein the winding dial and the dial housing are arranged into a line-inserting configuration; and the center channel and the insertion hole being concentrically positioned to each other.

12. The fishing line to lure connector as claimed in claim 10 further comprising:

the winding dial further comprising a dial handle, a first finger indentation, and a second finger indentation;

the dial handle being positioned perpendicular to the first dial base;

the dial handle being diametrically connected across the first dial base;

the first finger indentation and the second finger indentation traversing into the dial body from the first dial base;

the first finger indentation being positioned adjacent to the dial handle; and the second finger indentation being positioned adjacent to the dial handle, opposite to the first finger indentation.

13. The fishing line to lure connector as claimed in claim 12 further comprising:

the winding dial further comprising a dial indicator;

the dial housing further comprising a housing indicator;

the dial handle being positioned coplanar to the center channel;

the dial indicator being peripherally connected onto the dial handle;

the housing indicator being integrated into the housing lateral wall, coincident to the open housing base; and the housing indicator being positioned adjacent to the lure loop.

14. The fishing line to lure connector as claimed in claim 10 further comprising:

the ratcheting mechanism comprising a ratchet wheel, a wheel driver, a driver slot, a plurality of pawl protrusions, an ejection protrusion, and an ejection hole;

the wheel driver comprising a proximal driver end and a distal driver end;

the proximal driver end being centrally connected onto the second dial base;

the wheel driver being positioned normal to the second dial base;

the driver slot centrally traversing through the ratchet wheel;

the distal driver end being torsionally attached through the driver slot;

the plurality of pawl protrusions being radially connected within the housing lateral wall;

the plurality of pawl protrusions being positioned adjacent to the closed housing base;

the ratchet wheel being operatively engaged with the plurality of pawl protrusions, wherein the plurality of pawl protrusions is used to incrementally rotate the ratchet wheel;

the ejection protrusion being positioned colinear to the wheel driver;

the ejection protrusion being connected onto the distal driver end;

the ejection hole centrally traversing through the closed housing base; and the ejection protrusion being rotatably engaged into the ejection hole.

15. The fishing line to lure connector as claimed in claim 10 further comprising:

a plurality of draining holes;

the plurality of draining holes traversing out of the dial housing through the closed housing base; and the plurality of draining holes being radially distributed around the closed housing base.

16. A fishing line to lure connector comprising:

a dial housing;

a winding dial;

a ratcheting mechanism;

a lure loop;

the dial housing comprising an open housing base, a closed housing base, a housing lateral wall, and an insertion hole;

the winding dial comprising a dial body, a first dial base, a second dial base, a center channel, and an annular groove;

the open housing base and the closed housing base being positioned opposite to each other about the housing lateral wall;

the first dial base and the second dial base being positioned opposite to each other about the dial body;

the insertion hole traversing into the dial housing through the housing lateral wall;

the lure loop being externally connected to the housing lateral wall;

the lure loop and the insertion hole being positioned opposite to each other about the housing lateral wall;

the center channel laterally traversing through the dial body, coplanar to the insertion hole;

the dial body being rotatably mounted within the dial housing;

the annular groove being laterally integrated into the dial body;

the annular groove being intersected by the center channel;

the first dial base being positioned adjacent to the open housing base; and the second dial base being operatively connected to the closed housing base by the ratcheting mechanism, wherein the ratcheting mechanism is used to incrementally rotate the dial body in a first angular direction and is used to prevent rotation of the dial body in a second angular direction, and wherein the second angular direction is opposite to the first angular direction.

17. The fishing line to lure connector as claimed in claim 16 further comprising:

wherein the winding dial and the dial housing are arranged into a line-inserting configuration; and the center channel and the insertion hole being concentrically positioned to each other.

18. The fishing line to lure connector as claimed in claim 16 further comprising:

the winding dial further comprising a dial handle, a first finger indentation, a second finger indentation, and a dial indicator;

the dial housing further comprising a housing indicator;

the dial handle being positioned perpendicular to the first dial base;

the dial handle being diametrically connected across the first dial base;

the first finger indentation and the second finger indentation traversing into the dial body from the first dial base;

the first finger indentation being positioned adjacent to the dial handle;

the second finger indentation being positioned adjacent to the dial handle, opposite to the first finger indentation;

the dial handle being positioned coplanar to the center channel;

the dial indicator being peripherally connected onto the dial handle;

the housing indicator being integrated into the housing lateral wall, coincident to the open housing base; and the housing indicator being positioned adjacent to the lure loop.

19. The fishing line to lure connector as claimed in claim 16 further comprising:

the ratcheting mechanism comprising a ratchet wheel, a wheel driver, a driver slot, a plurality of pawl protrusions, an ejection protrusion, and an ejection hole;

the wheel driver comprising a proximal driver end and a distal driver end;

the proximal driver end being centrally connected onto the second dial base;

the wheel driver being positioned normal to the second dial base;

the driver slot centrally traversing through the ratchet wheel;

the distal driver end being torsionally attached through the driver slot;

the plurality of pawl protrusions being radially connected within the housing lateral wall;

the plurality of pawl protrusions being positioned adjacent to the closed housing base;

the ratchet wheel being operatively engaged with the plurality of pawl protrusions, wherein the plurality of pawl protrusions is used to incrementally rotate the ratchet wheel;

the ejection protrusion being positioned colinear to the wheel driver;

the ejection protrusion being connected onto the distal driver end;

the ejection hole centrally traversing through the closed housing base; and the ejection protrusion being rotatably engaged into the ejection hole.

20. The fishing line to lure connector as claimed in claim 16 further comprising:

a plurality of draining holes;

the plurality of draining holes traversing out of the dial housing through the closed housing base; and the plurality of draining holes being radially distributed around the closed housing base.

* * * * *